United States Patent
Luo et al.

(10) Patent No.: US 9,323,909 B1
(45) Date of Patent: Apr. 26, 2016

(54) SHARING A CRYPTOGRAPHIC DEVICE BY PARTITIONING CHALLENGE-RESPONSE SPACE

(71) Applicant: EMC Corporation, Hopkinton, MA (US)

(72) Inventors: Guoying Luo, Lexington, MA (US); Ari Juels, Brookline, MA (US); Kevin D. Bowers, Melrose, MA (US)

(73) Assignee: EMC Corporation, Hopkinton, MA (US)

( * ) Notice: Subject to any disclaimer, the term of this patent is extended or adjusted under 35 U.S.C. 154(b) by 194 days.

(21) Appl. No.: 13/708,343

(22) Filed: Dec. 7, 2012

(51) Int. Cl.
*G06F 21/00* (2013.01)
*G06F 21/31* (2013.01)

(52) U.S. Cl.
CPC ..................................... *G06F 21/31* (2013.01)

(58) Field of Classification Search
USPC ................. 713/159, 172, 184, 185; 726/9, 20
See application file for complete search history.

(56) References Cited

U.S. PATENT DOCUMENTS

| | | | | |
|---|---|---|---|---|
| 5,627,355 A | * | 5/1997 | Rahman et al. | 235/380 |
| 6,067,621 A | * | 5/2000 | Yu et al. | 713/172 |
| 6,671,808 B1 | * | 12/2003 | Abbott et al. | 726/4 |
| 8,181,234 B2 | * | 5/2012 | Ishida | 726/7 |
| 2003/0163698 A1 | * | 8/2003 | Kim et al. | 713/171 |
| 2008/0109899 A1 | * | 5/2008 | Rijnswou Van et al. | 726/21 |
| 2008/0159534 A1 | * | 7/2008 | Rager et al. | 380/247 |
| 2012/0174207 A1 | * | 7/2012 | Zhu et al. | 726/9 |

* cited by examiner

*Primary Examiner* — Eleni Shiferaw
*Assistant Examiner* — Paul Callahan
(74) *Attorney, Agent, or Firm* — Ryan, Mason & Lewis, LLP

(57) ABSTRACT

Techniques, apparatus and articles of manufacture are provided herein. A method includes providing a first sub-set of authentication information from a set of authentication information associated with a first cryptographic device issued to a user to a second cryptographic device in connection with a first user authentication request responsive to a request from the user to access a first protected resource, wherein the first sub-set comprises a first set of N pre-computed passcodes and corresponding challenges, and providing a second sub-set of authentication information from the set of authentication information associated with the first cryptographic device to a third cryptographic device in connection with a second user authentication request responsive to a request from the user to access a second protected resource, wherein the second sub-set comprises a second set of N pre-computed passcodes and corresponding challenges.

20 Claims, 4 Drawing Sheets

SHARING A CRYPTOGRAPHIC DEVICE BY PARTITIONING CHALLENGE-RESPONSE SPACE

FIELD

The field relates generally to cryptography, and more particularly, to security techniques for authenticating one or more users over a network or in other types of communication systems.

BACKGROUND

In order to gain access to applications or other resources via a computer or another user device, users are often required to authenticate themselves by entering authentication information. Such authentication information may include, for example, passwords that are generated by a security token carried by a user. These passwords may be, for example, one-time passwords that are generated using a time-synchronous or event-based algorithm.

In most existing token-based user authentication systems, a token belonging to a user U generates a one-time passcode for consumption by a single server S. In a symmetric-key-based scheme, the secret cryptographic keys from the token are shared with an authentication server. In most symmetric-key-based schemes, an adversary that compromises server S can impersonate user U by stealing the user's credentials from server S. Such an attack requires only transient server compromise; that is, the adversary need only learn the state of server S, and need not alter the operation of server S. In other attacks, the adversary can control the operation of server S over an extended period of time. Such an adversary can subvert the authentication process, impersonating user U even if the user's credentials are periodically refreshed, and even if authentication relies on public-key operations.

As noted, in a traditional symmetric-key cryptographic authentication setting, a server and a client share the same symmetric-key. By way of illustration, the RSA SecurID® user authentication token, commercially available from RSA Security Inc. of Bedford, Mass., U.S.A., can be used as an example. The SecurID® authentication server is replete with seed records, and the seed records are provisioned to the users by either sending the users a SecurID® hardware token or issuing SecurID® software token records.

Additionally, a token record provisioning process can be a difficult and costly process. In a SecurID® hardware token example, the token record provisioning process involves delivering a physical token to each user. In a SecurID® software token example, users are required to go through a series of steps, such as typing in a long uniform resource locator (URL) or 81 numeric numbers. Such steps may lead to unsatisfied customers and/or increasing numbers of support calls.

Accordingly, a need exists to provide a token (hardware or software) that, once provisioned to a user, can be shared by multiple service providers for authentication. Also, in contrast to single sign-on schemes that utilize an online central authentication service to perform authentication, it would be advantageous to provide a mechanism that allows service providers to perform their own authentications without knowing the symmetric-key that the client token holds.

SUMMARY

One or more illustrative embodiments of the present invention provide techniques for sharing a cryptographic device by partitioning challenge-response space.

In accordance with an aspect of the invention, a method is provided comprising the steps of: providing a first sub-set of authentication information from a set of authentication information associated with a first cryptographic device issued to a user to a second cryptographic device in connection with a first user authentication request responsive to a request from the user to access a first protected resource, wherein the first sub-set of authentication information comprises a first set of N pre-computed passcodes and challenges corresponding to the first set of N pre-computed passcodes, and providing a second sub-set of authentication information from the set of authentication information associated with the first cryptographic device to a third cryptographic device in connection with a second user authentication request responsive to a request from the user to access a second protected resource, wherein the second sub-set of authentication information comprises a second set of N pre-computed passcodes and challenges corresponding to the second set of N pre-computed passcodes.

In another aspect of the invention, a method is providing comprising the steps of: providing a first sub-set of authentication information from a set of authentication information associated with a first cryptographic device issued to a user to a second cryptographic device in connection with a first user authentication request responsive to a request from the user to access a first protected resource, wherein the first sub-set of authentication information comprises a first derived secret key for passcode generation to be shared between the first cryptographic device and the second cryptographic device, and providing a second sub-set of authentication information from the set of authentication information associated with the first cryptographic device to a third cryptographic device in connection with a second user authentication request responsive to a request from the user to access a second protected resource, wherein the second sub-set of authentication information comprises a second derived secret key for passcode generation to be shared between the first cryptographic device and the third cryptographic device.

The authentication techniques of the illustrative embodiments overcome one or more of the problems associated with the conventional techniques described previously, and provide a mechanism for sharing a provisioned token among multiple service providers for authentication. These and other features and advantages of the present invention will become more readily apparent from the accompanying drawings and the following detailed description.

DETAILED DESCRIPTION

Figure 1:
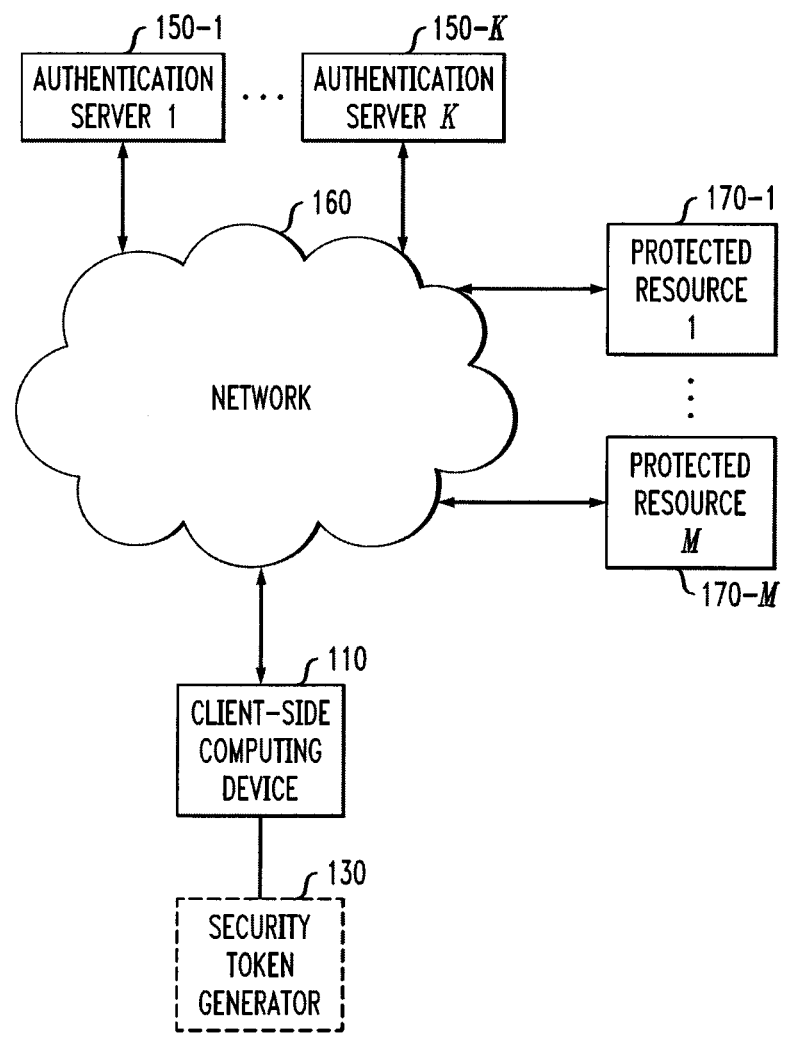
FIG. 1 is a diagram illustrating an example network environment in which one or more embodiments of the present invention can operate.

As will be described, the present invention, in one or more illustrative embodiments, provides a mechanism that permits a single token (hardware or software) to be provisioned for a user in such a way that the token is useable by multiple, distinct service providers to authenticate the user. Additionally, at least one embodiment of the invention supports challenge-response-type tokens, including tokens that store challenge-response pairs. Further, at least one embodiment of the invention supports metered enterprise models in which authenticating entities acquire batches of one-time authentication values.

In enabling the sharing of the same client token by multiple service providers, one or more embodiments of the invention include partitioning a challenge-response space. As described in further detail below, partitioning a challenge-response space can include using stored-passcodes, and can also include using derived seeds (also referred to herein as secret keys k).

A stored-passcode (SP) authentication token is a token that is loaded with pre-computed passcodes and releases those pre-computed passcodes, rather than computing and releasing the passcodes on-the-fly. An SP token, in contrast to the conventional challenge-response token, is pre-loaded with a collection of passcodes $P_1, \ldots, P_n$. In response to input t, the SP token outputs $P_t$. Typically, the value t can represent the current time (as determined by an internal or external clock), a counter value maintained by the token, or a challenge value. SP tokens have the advantage of requiring less computation on the fly, thus requiring less power consumption. Additionally, SP tokens can avoid vulnerabilities to side-channel attacks associated with online cryptographic computation.

Also, as noted herein, a challenge-response token can be used for authentication. A challenge-response token stores a secret key k. In response to a challenge c, the token outputs a response $r=f(k;c)$, for some cryptographic function $f$ (for example, a hash function). A challenge-response authentication scheme carries a security advantage over counter-based schemes, which are vulnerable to passcode harvesting and re-use by attackers. Also, challenge-response authentication schemes are often preferable to time-based schemes because challenge-response authentication schemes avoid the need for the authentication token to maintain the current time and synchronize reliably with authentication servers.

Illustrative embodiments of the present invention will be described herein with reference to exemplary communication systems and associated processing devices. It is to be appreciated, however, that the invention is not restricted to use with the particular illustrative system and device configurations shown.

Accordingly, the term "communication system," as used herein, is intended to be broadly construed so as to encompass any type of system in which multiple processing devices can communicate with one another. Also, the term "cryptographic device," as used herein, is intended to be construed broadly, so as encompass any type of processing device that incorporates cryptographic functionality (such as a computer, server, mobile telephone, radio-frequency identification (RFID) tag or reader, authentication token, etc.).

Similarly, the term "authentication server" should be understood to encompass any type of processing device or set of such devices that is operative to authenticate a passcode provided by an authentication token or other type of cryptographic device. It need not be a network-based server, and may be implemented as a portion of a device that performs other functions, as a combination of multiple servers or other devices, or in other forms.

Additionally, the term "authentication information," as used herein, is intended to include passwords, passcodes, answers to life questions, or other authentication credentials, or values derived from such authentication credentials, or more generally any other information that a user may be required to submit in order to obtain access to an access-controlled application. Similarly, the term "passcode," as used herein, is intended to include authentication information such as one-time passcodes (OTPs), or more generally any other information that may be utilized for cryptographic authentication purposes.

FIG. 1 illustrates an example client-side computing device (CSCD) 110 communicating with protected resources 170-1 through 170-M over a network 160. In an example implementation, a user must authenticate with one or a plurality of authentication servers 150-1 through 150-K (hereinafter, collectively referred to as authentication servers 150) using a token generated by a security token generator 130 (hereinafter, referred to as security token 130) before obtaining access to protected resources 170-1 through 170-M. Accordingly, in an example embodiment of the invention, each protected resource corresponds to and is protected by a particular authentication server, and a user must authenticate with that authentication server (for example, 150-1) before obtaining access to the corresponding protected resource (for example 170-1).

The network 160, may comprise, for example, a global computer network such as the Internet, a wide area network (WAN), a local area network (LAN), a satellite network, a telephone or cable network, or various portions or combinations of these and other types of networks.

According to one aspect of the invention, the user of the CSCD 110 is authenticated using a one-time passcode generated by the security token generator 130 by authentication servers 150. The exemplary communications among the system elements 110, 130, 150 and 170 of FIG. 1 to achieve joint authentication by the authentication servers 150 is discussed further below.

It is to be appreciated that a given embodiment of the disclosed system may include multiple instances of CSCD 110, security token 130 and protected resource 170, and possibly other system components, although only single instances of such components are shown in the simplified system diagram of FIG. 1 for clarity of illustration.

Further, as used herein, the term "session" with a protected resource 170 shall mean an interactive information interchange between a CSCD 110 and the protected resource 170.

The security token 130 is shown in FIG. 1 as being separate from and electrically connected to the CSCD 110. The security token 130 may be implemented, for example, using the RSA SecurID® user authentication token, as noted above. The security token 130 may be a server or other type of module that is accessible over the network 160, or it may be a software component resident on the CSCD 110. As another alternative, security token 130 may be distributed over multiple devices, one of which may be the CSCD 110.

Accordingly, while at least one embodiment of the present invention is illustrated herein using a security token 130 electrically connected to the CSCD 110, such that the CSCD 110 can read a given token code (or another authentication value) directly from the token 130, other implementations are within the scope of the present invention, as would be apparent to a person of ordinary skill in the art. By way of example, for security tokens 130 that are not connectable to a computer or other user device in this manner, the user may manually enter a password or another value displayed by the token 130 at the time of the attempted access.

The CSCD 110 may represent a portable device, such as a mobile telephone, personal digital assistant (PDA), wireless email device, game console, etc. The CSCD 110 may alternatively represent a desktop or laptop personal computer (PC), a microcomputer, a workstation, a mainframe computer, a wired telephone, a television set top box, or any other information processing device which can benefit from the use of authentication techniques in accordance with the invention.

The CSCD 110 may also be referred to herein as simply a "user." The term "user," as used in this context, should be understood to encompass, by way of example and without limitation, a user device, a person utilizing or otherwise associated with the device, or a combination of both. An operation described herein as being performed by a user may therefore, for example, be performed by a user device, a person utilizing or otherwise associated with the device, or by a combination of both the person and the device. Similarly, a password or other authentication information described as being associated with a user may, for example, be associated with a CSCD device 110, a person utilizing or otherwise associated with the device, or a combination of both the person and the device.

As also depicted in FIG. 1, the authentication servers 150 are typically associated with a third party entity, such as an authentication authority, that processes authentication requests on behalf of web servers and other resources, as well as verifies the authentication information that is presented by a CSCD 110.

Further, a protected resource 170 may be, for example, an access-controlled application, web site or hardware device. In other words, a protected resource 170 is a resource that grants user access responsive to an authentication process, as will be described in greater detail below. A protected resource 170 may be, for example, a remote application server such as a web site or other software program or hardware device that is accessed by the CSCD 110 over a network 160.

Accordingly, as detailed herein, at least one embodiment of the invention includes partitioning a challenge-response space using stored-passcode authentication. Stored-passcode authentication can be carried out without full knowledge of the root secret, for example, the seed of the user token. As such, a stored-passcode scheme allows for the use of a client token that may not be aware of the party to which it is authenticated. The challenge-response space partitioning is carried out via a central authentication service; thus, no additional seed provisioning is required on the client side after the token delivery.

Additionally, in a stored-passcode scheme, a central authentication service acts as a token repository and provisioning service. The central authentication service possesses and maintains all token records, and consumers interface with the central authentication service for token provisioning (either hardware or software token material delivery). The service provider can obtain a set of pre-computed token passcodes from the central authentication service and use these pre-computed token passcodes for the authentication of a user.

By way of illustration, consider the following example. A user (referred to in this example as Alice) receives a token from Authentication Service X. Service providers such as Bank Y and Retail Enterprise Z sign-up or enroll with the Authentication Service X for access to corresponding authentication services. During registration, Alice indicates to Retail Enterprise Z that she possesses a central challenge-response token. The authentication server of Retail Enterprise Z contacts Authentication Service X to buy or obtain a set of N pre-computed passcodes from Alice's token, $P_1, P_2 \ldots P_n$, along with the corresponding challenges of $c_1, c_2 \ldots c_n$.

In an authentication phase, Alice requests to login to a resource of Retail Enterprise Z. The authentication service of Retail Enterprise Z sends Alice a challenge $c_k$, where $c_k$ is randomly selected from $c_k \in \{c_1, c_2 \ldots c_n\}$. Alice inputs the challenge into her token and computes a passcode $P_k$. Accordingly, Alice sends $P_k$ to the authentication service of Retail Enterprise Z and completes the authentication. In a post-authentication phase, the authentication service of Retail Enterprise Z erases or marks $P_k$ as being used, so as to prevent a passcode replay attack.

Similarly, in the above example, service provider Bank Y can proceed through the same steps as Retail Enterprise Z (although with a different set of authentication information) to enroll and authenticate Alice. Note that neither Retail Enterprise Z nor Bank Y is charged with delivering the token to Alice. Furthermore, after all of the pre-computed passcodes obtained from Authentication Service X have been used, the service provider can buy or obtain additional passcodes from Authentication Service X.

For different service providers (such as Retail Enterprise Z and Bank Y), challenge-response space should not overlap with each other. In other words, different service providers will not retrieve the same $\{c_k, P_k\}$ pair from Authentication Service X for user Alice. This prevents the attack of one service provider impersonating the user to authenticate to the other service provider, with the knowledge of the user secret.

Additionally, challenge-response space can be partitioned sequentially. For example, Authentication Service X can allocate $\{\{c_{101}, P_{101}\}, \{c_{102}, P_{102}\} \ldots \{c_{200}, P_{200}\}\}$ of Alice's pre-computed passcodes (along with the challenges) to Retail Enterprise Z, while allocating $\{\{c_{201}, P_{201}\}, \{c_{202}, P_{202}\} \ldots \{c_{300}, P_{300}\}\}$ to Bank Y. While such an approach may be vulnerable to the guessing of a service provider's challenge, at least one embodiment of the invention can include randomizing the issuing sequence of challenges that a service provider sends to the user to make it difficult to guess the next challenge.

Accordingly, instead of partitioning the challenge-response space sequentially, Authentication Service X can randomize the challenge-response space that is allocated to a service provider. In at least one embodiment of the invention, the entire set of challenge space (or a portion of the entire challenge space) can be randomized prior to allocating a set of the resulting challenges to a service provider. By way of illustration, consider the following example. A set of challenges that includes $\{c_1, c_2, c_3, c_4, c_5, c_6, c_7, c_8\}$ is randomized as $\{c_2, c_5, c_3, c_8, c_7, c_1, c_6, c_4\}$. Subsequently, $\{c_2, c_5, c_3, c_8\}$ is allocated to a first service provider, and $\{c_7, c_1, c_6, c_4\}$ is allocated to a second service provider. In such an embodiment, the goals of randomized challenges and non-overlapping challenge space can be jointly achieved.

Additionally, at least one embodiment of the invention includes utilization of pre-computed passcodes and passcode erasure on the client side. Client side devices, such as personal computers, smart phones and key fobs, can be equipped with storage that makes storing pre-computed passcodes on the client side possible. With pre-computed passcodes stored on both the client side and server side, an authentication scheme can effectively become a one-time pad, provided that used passcodes are erased and not re-used.

At least one embodiment of the invention also includes passcode revocation. For example, in a situation where the service provider (for example, Bank Y) suspects that a portion of pre-computed passcodes have been accessed by an attacker, this portion of pre-computed passcodes (for example, challenge-response pairs) can be revoked and a new set of pre-computed passcodes can be retrieved from the authentication service (such as Authentication Service X). The revoked challenges, along with the pre-computed responses, can be eradicated so as to preclude future use or reuse. In such an instance, the user (for example, Alice) is not affected and will not be required to provision a new token.

This is in contrast to a situation wherein a user's token is compromised. In such an instance, the user seed is compromised and a new user token is required to be issued, which leads to a new enrollment process of the user to all the service providers he/she enrolled with using the original token, as described above.

Figure 2:
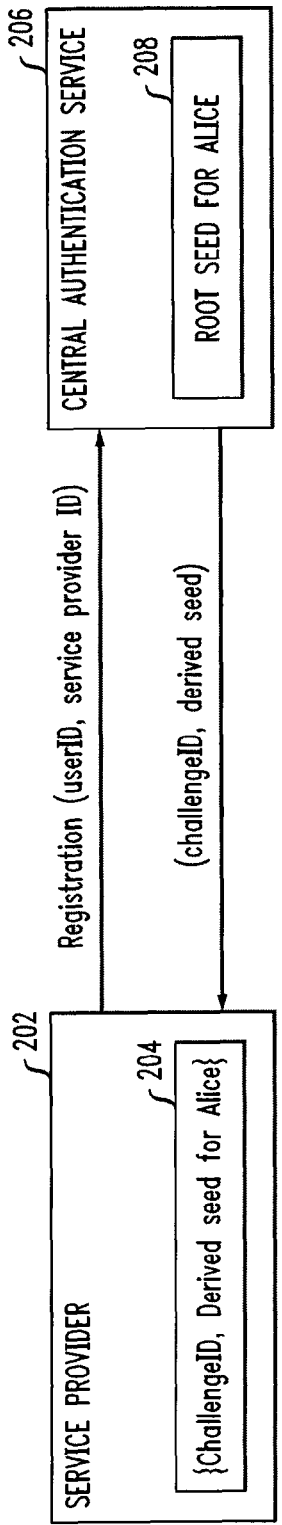
FIG. 2 and FIG. 3 are diagrams illustrating techniques for partitioning a challenge-response space using seed derivation, according to an embodiment of the present invention.
Figure 3:
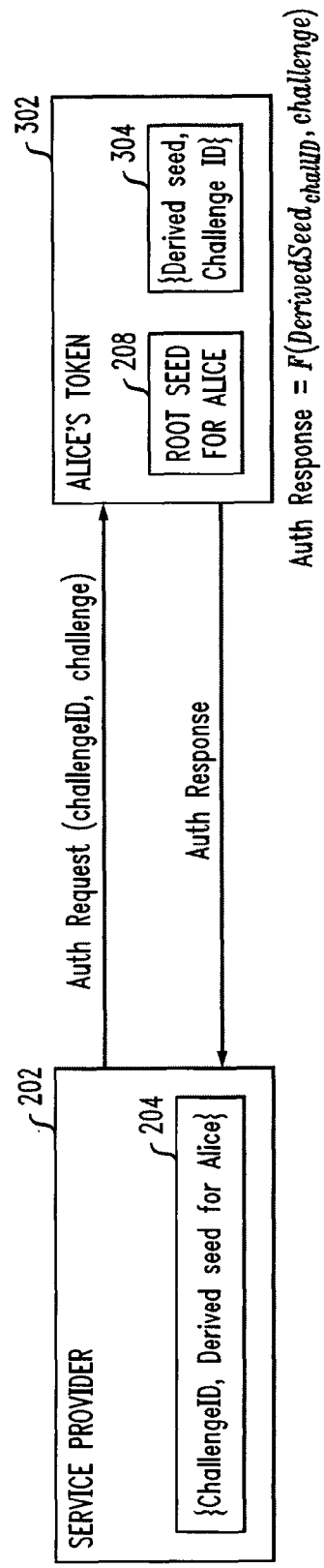

FIG. 2 and FIG. 3 are diagrams illustrating techniques for partitioning a challenge-response space using seed derivation, according to an embodiment of the present invention. By way of illustration, a service provider 202 (such as Retail Enterprise Z or Bank Y in the above examples) registers, as depicted in FIG. 2, with central authentication service 206 (such as Authentication Service X in the above examples) to request a derived seed for the user (Alice).

As depicted in FIG. 2, the central authentication service 206 contains a root seed 208 for Alice. The central authentication service 206, in response to the registration indication, provides a derived seed for Alice and corresponding challenges 204 to the service provider 202. By way of example, root seed 208 might include a randomly-generated 128-bit key, and the derived seed can include a key generated based on the root seed as well as the challenger identifier (ID) as a result of a function such as a hash function.

During an authentication phase, as depicted in FIG. 3, the service provider 202 sends to Alice a challenge along with a corresponding challenge identifier (ID) as received from the central authentication service 206 in conjunction with the derived seed (as depicted in FIG. 2). A user token 302 calculates the derived seed 304 based on the challenge ID received from the service provider 202, and provides an authentication response to the challenge back to the service provider 202. A challenge-response function can be represented as F(DerivedSeed$_{challID}$, challenge), wherein the function can include a variety of functions (a hash function, etc.).

Also, in at least one embodiment of the invention, the user token 302 can save the derived seed calculated for the challenge ID for future use.

In accordance with at least one embodiment of the invention, a challenge ID can be a variable number of digits appended to the challenge. By way merely of example, a challenge ID-challenge pair can visually appear to the user as 189399300, where 189 is the challenge ID and 399300 is the actual challenge. Note also that, in one or more embodiments of the invention, the number of challenge IDs that can be used for the specific client token is limited by the number of service providers with which the client token is enrolled.

As a challenge ID can be potentially guessed or surmised by an attacker, in order to prevent replay attack, a service provider authenticator should not re-use a challenge. Additionally, as described herein, at least one embodiment of the invention includes randomizing the challenge space and issuing challenges in an order resulting from the randomized challenge space. Additionally, as also described herein, when a service provider requests a new challenge ID-derived seed pair from an authentication service, the previous or used pair can be revoked and not re-used.

Figure 4:
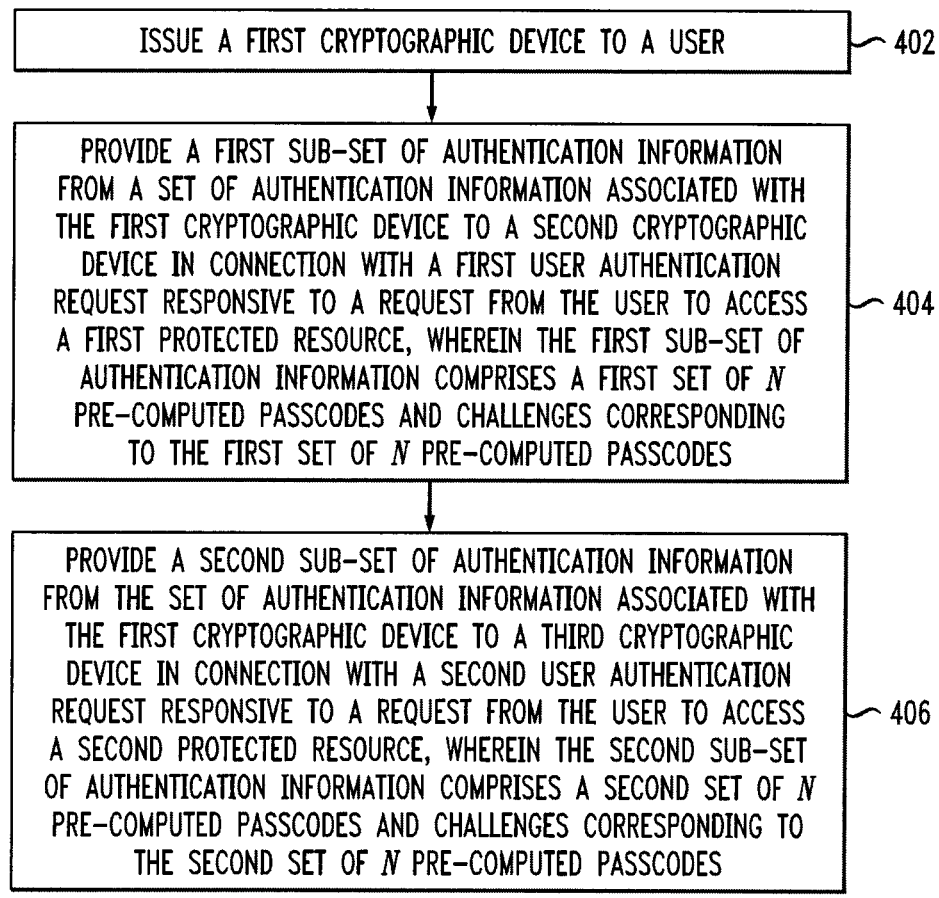
FIG. 4 is a flow diagram illustrating techniques for sharing a cryptographic device by partitioning challenge-response space, according to an embodiment of the invention.

FIG. 4 is a flow diagram illustrating techniques for sharing a cryptographic device by partitioning challenge-response space, according to an embodiment of the present invention. Step 402 includes issuing a first cryptographic device to a user. As detailed herein, the first cryptographic device can include a stored-passcode authentication token, wherein the stored-passcode authentication token is loaded with a set of pre-computed passcodes. Additionally, as noted, the first cryptographic device can include a hardware component or a software component resident on a device (for example, a user device such as a smart phone).

Step 404 includes providing a first sub-set of authentication information from a set of authentication information associated with the first cryptographic device to a second cryptographic device in connection with a first user authentication request responsive to a request from the user to access a first protected resource, wherein the first sub-set of authentication information comprises a first set of N pre-computed passcodes and challenges corresponding to the first set of N pre-computed passcodes. The second cryptographic device, as described herein, can include a first authentication authority (for example, a first service provider).

Step 406 includes providing a second sub-set of authentication information from the set of authentication information associated with the first cryptographic device to a third cryptographic device in connection with a second user authentication request responsive to a request from the user to access a second protected resource, wherein the second sub-set of authentication information comprises a second set of N pre-computed passcodes and challenges corresponding to the second set of N pre-computed passcodes. The third cryptographic device, as also described herein, can include a second authentication authority (for example, a second service provider).

As also detailed herein, each of the second cryptographic device, the third cryptographic device, and any of one or more additional cryptographic devices can include a hardware component, a software component resident on a device, and/or a combination thereof.

The techniques depicted in FIG. 4 can also include eradicating a sub-set of authentication information upon revocation of the sub-set of authentication information from the corresponding cryptographic device. Additionally, at least one embodiment of the invention includes randomizing the set of authentication information associated with the first cryptographic device prior to providing a sub-set of authentication information to an additional cryptographic device.

Further, the techniques depicted in FIG. 4 can include providing one or more additional sub-sets of authentication information from the set of authentication information associated with the first cryptographic device to one or more additional cryptographic devices in connection with one or more additional user authentication request related to a request from the user to access one or more additional protected resources.

Figure 5:
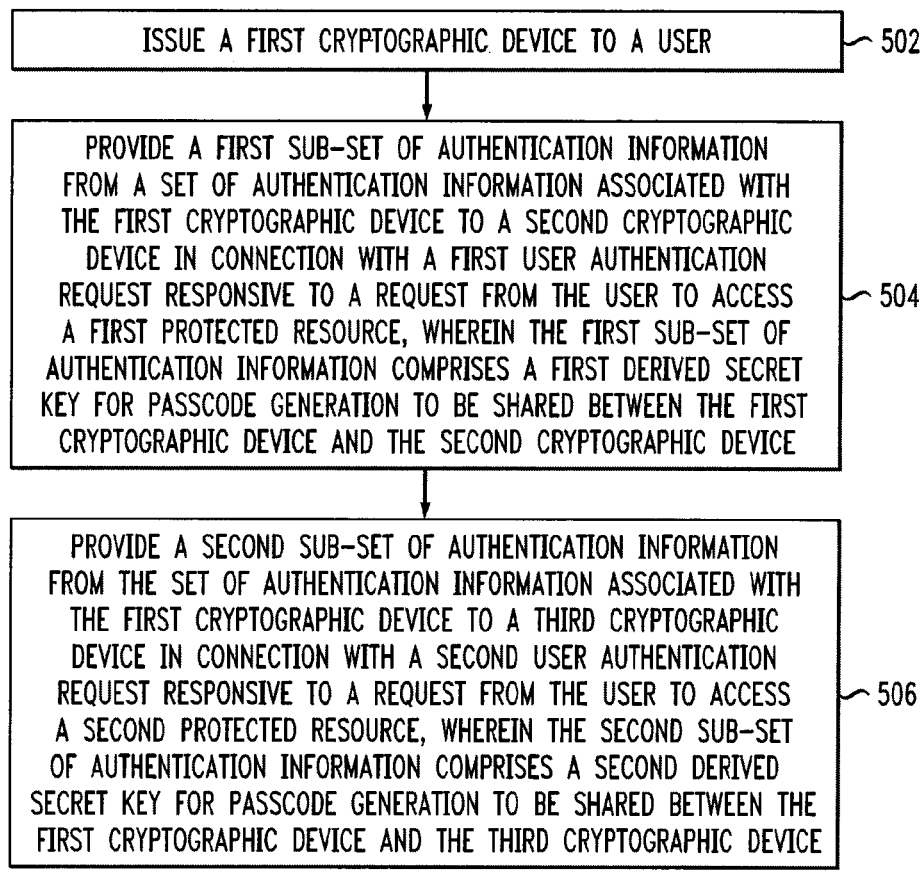
FIG. 5 is a flow diagram illustrating techniques for sharing a cryptographic device by partitioning challenge-response space, according to an embodiment of the invention.

FIG. 5 is a flow diagram illustrating techniques for sharing a cryptographic device by seed derivation, according to an embodiment of the invention. Step 502 includes issuing a first cryptographic device to a user. As detailed herein, the first cryptographic device can include a stored-passcode authentication token (loaded with a set of pre-computed passcodes).

Step 504 includes providing a first sub-set of authentication information from a set of authentication information associated with the first cryptographic device to a second cryptographic device in connection with a first user authentication request responsive to a request from the user to access a first protected resource, wherein the first sub-set of authentication information comprises a first derived secret key for passcode generation to be shared between the first cryptographic device and the second cryptographic device. As similarly noted above in connection with FIG. 4, the second cryptographic device can include a first authentication authority representing a first service provider.

Step 506 includes providing a second sub-set of authentication information from the set of authentication information associated with the first cryptographic device to a third cryptographic device in connection with a second user authentication request responsive to a request from the user to access a second protected resource, wherein the second sub-set of authentication information comprises a second derived secret key for passcode generation to be shared between the first cryptographic device and the third cryptographic device. As also similarly noted above in connection with FIG. 4, the third cryptographic device can include a second authentication authority representing a second service provider.

Figure 6:
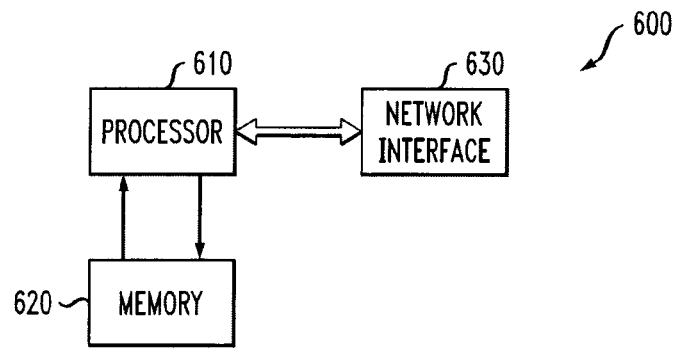
FIG. 6 illustrates one possible implementation of a given client-side computing device, authentication authority, protected resource or another processing device of the example network environment of FIG. 1.

FIG. 6 illustrates one possible implementation of a given client-side computing device, authentication authority, protected resource or another processing device of the example network environment of FIG. 1. The processing device 600 as shown may be viewed as representing, for example, CSCD 110, security token generator 130, authentication servers 150 and protected resource 170. The processing device 600 in this implementation includes a processor 610 coupled to a memory 620 and a network interface 630. These device elements may be implemented in whole or in part as a conventional microprocessor, digital signal processor, application-specific integrated circuit (ASIC) or other type of circuitry, as well as portions or combinations of such circuitry elements.

As will be appreciated by those skilled in the art, portions of an authentication technique in accordance with an embodiment of the invention can be implemented at least in part in the form of one or more software programs that are stored in memory 620 and executed by the corresponding processor 610. The memory 620 is also used for storing information used to perform computations or other operations associated with the disclosed authentication on techniques.

It should again be emphasized that the above-described embodiments of the present invention are presented for purposes of illustration only. Many variations and other alternative embodiments may be used. By way of example, the techniques are applicable to a wide variety of other types of communication systems and cryptographic devices that can benefit from a mechanism allowing for sharing of a provisioned token among multiple service providers for authentication.

Accordingly, the particular illustrative configurations of system and device elements detailed herein can be varied in other embodiments. These and numerous additional alternative embodiments within the scope of the appended claims will be readily apparent to those skilled in the art.

What is claimed is:

1. A method comprising:
   partitioning a set of multiple pre-computed passcodes and multiple challenges corresponding thereto associated with a given authentication token issued to a given user into multiple non-overlapping sub-sets of authentication information associated with the given authentication token issued to the given user, wherein each respective one of the multiple non-overlapping sub-sets of authentication information comprises (i) one or more distinct pre-computed passcodes selected from the multiple pre-computed passcodes and (ii) one or more distinct challenges (a) selected from the multiple challenges and (b) corresponding to the selected one or more distinct pre-computed passcodes;
   randomizing each of the multiple non-overlapping sub-sets of authentication information associated with the given authentication token issued to the given user prior to providing a sub-set of authentication information to an authentication authority;
   providing, from the multiple non-overlapping sub-sets of authentication information, a first randomized sub-set of authentication information associated with the given authentication token issued to the given user to a first authentication authority in connection with a first user authentication request responsive to a request from the given user to access a first protected resource; and
   providing, from the multiple non-overlapping sub-sets of authentication information, a second randomized sub-set of authentication information associated with the given authentication token to a second authentication authority in connection with a second user authentication request responsive to a request from the given user to access a second protected resource.

2. The method of claim 1, wherein the first authentication authority comprises a first service provider.

3. The method of claim 1, wherein the second authentication authority comprises a second service provider.

4. The method of claim 1, wherein the given authentication token comprises a hardware component.

5. The method of claim 1, wherein the given authentication token comprises a software component resident on a device.

6. The method of claim 1, further comprising:
   eradicating a sub-set of authentication information upon revocation of the sub-set of authentication information from the corresponding authentication authority.

7. The method of claim 1, further comprising:
   providing one or more additional sub-sets of authentication information from the multiple pre-computed passcodes and multiple challenges corresponding thereto associated with the given authentication token issued to the given user to one or more additional authentication authorities in connection with one or more additional user authentication requests related to a request from the given user to access one or more additional protected resources.

8. An article of manufacture comprising a non-transitory processor-readable storage medium having processor-readable instructions tangibly embodied thereon which, when implemented, cause a processor to carry out the steps of the method of claim 1.

9. A method comprising:
   partitioning a set of multiple derived keys for passcode generation and multiple challenges corresponding thereto associated with a given authentication root key issued to a given user into multiple non-overlapping sub-sets of authentication information associated with the given authentication root key issued to the given user, wherein each of the multiple non-overlapping sub-sets of authentication information comprises (i) a given derived key, selected from the multiple derived keys, for passcode generation to be shared between a cryptographic device associated with the given user and a given authentication authority, and (ii) one or more of the multiple challenges corresponding thereto;
   providing, from the multiple non-overlapping sub-sets of authentication information, a first sub-set of authentication information associated with the given authentication root key issued to the given user to a first authentication authority representing a first service provider in connection with a first user authentication request responsive to a request from the given user to access a first protected resource, wherein the first sub-set of authentication information comprises a first derived secret key for passcode generation to be shared between the cryptographic device associated with the given user and the first authentication authority; and
   providing, from the multiple non-overlapping sub-sets of authentication information, a second sub-set of authentication information associated with the given authentication root key issued to the given user to a second authentication authority representing a second service provider in connection with a second user authentication request responsive to a request from the given user to access a second protected resource, wherein the second sub-set of authentication information comprises a second derived secret key for passcode generation to be shared between the cryptographic device associated with the given user and the second authentication authority.

10. An article of manufacture comprising a non-transitory processor-readable storage medium having processor-readable instructions tangibly embodied thereon which, when implemented, cause a processor to carry out the steps of the method of claim 9.

11. The method of claim 9, further comprising:
randomizing each of the multiple non-overlapping sub-sets of authentication information associated with the given authentication root key issued to the given user prior to providing a sub-set of authentication information to an authentication authority.

12. The method of claim 9, further comprising:
eradicating a sub-set of authentication information upon revocation of the sub-set of authentication information from the corresponding authentication authority.

13. An apparatus comprising:
a memory; and
at least one processor coupled to the memory and operative for:
partitioning a set of multiple pre-computed passcodes and multiple challenges corresponding thereto associated with a given authentication token issued to a given user into multiple non-overlapping sub-sets of authentication information associated with the given authentication token issued to the given user, wherein each respective one of the multiple non-overlapping sub-sets of authentication information comprises (i) one or more distinct pre-computed passcodes selected from the multiple pre-computed passcodes and (ii) one or more distinct challenges (a) selected from the multiple challenges and (b) corresponding to the selected one or more distinct pre-computed passcodes;
randomizing each of the multiple non-overlapping sub-sets of authentication information associated with the given authentication token issued to the given user prior to providing a sub-set of authentication information to an authentication authority;
providing, from the multiple non-overlapping sub-sets of authentication information, a first randomized sub-set of authentication information associated with the given authentication token issued to the given user to a first authentication authority in connection with a first user authentication request responsive to a request from the given user to access a first protected resource; and
providing, from the multiple non-overlapping sub-sets of authentication information, a second randomized sub-set of authentication information associated with the given authentication token to a second authentication authority in connection with a second user authentication request responsive to a request from the given user to access a second protected resource.

14. The apparatus of claim 13, wherein the given authentication token comprises a hardware component.

15. The apparatus of claim 13, wherein the given authentication token comprises a software component resident on a device.

16. The apparatus of claim 13, wherein the at least one processor is further operative for:
eradicating a sub-set of authentication information upon revocation of the sub-set of authentication information from the corresponding authentication authority.

17. The apparatus of claim 13, wherein the at least one processor is further operative for:
providing one or more additional sub-sets of authentication information from the multiple pre-computed passcodes and multiple challenges corresponding thereto associated with the given authentication token issued to the given user to one or more additional authentication authorities in connection with one or more additional user authentication requests related to a request from the given user to access one or more additional protected resources.

18. An apparatus comprising:
a memory; and
at least one processor coupled to the memory and operative for:
partitioning a set of multiple derived keys for passcode generation and multiple challenges corresponding thereto associated with a given authentication root key issued to a given user into multiple non-overlapping sub-sets of authentication information associated with the given authentication root key issued to the given user, wherein each of the multiple non-overlapping sub-sets of authentication information comprises (i) a given derived key, selected from the multiple derived keys, for passcode generation to be shared between a cryptographic device associated with the given user and a given authentication authority, and (ii) one or more of the multiple challenges corresponding thereto;
providing, from the multiple non-overlapping sub-sets of authentication information, a first sub-set of authentication information associated with the given authentication root key issued to the given user to a first authentication authority representing a first service provider in connection with a first user authentication request responsive to a request from the given user to access a first protected resource, wherein the first sub-set of authentication information comprises a first derived secret key for passcode generation to be shared between the cryptographic device associated with the given user and the first authentication authority; and
providing, from the multiple non-overlapping sub-sets of authentication information, a second sub-set of authentication information associated with the given authentication root key issued to the given user to a second authentication authority representing a second service provider in connection with a second user authentication request responsive to a request from the given user to access a second protected resource, wherein the second sub-set of authentication information comprises a second derived secret key for passcode generation to be shared between the cryptographic device associated with the given user and the second authentication authority.

19. The apparatus of claim 18, wherein the at least one processor is further operative for:
randomizing each of the multiple non-overlapping sub-sets of authentication information associated with the given authentication root key issued to the given user prior to providing a sub-set of authentication information to an authentication authority.

20. The apparatus of claim 18, wherein the at least one processor is further operative for:

eradicating a sub-set of authentication information upon revocation of the sub-set of authentication information from the corresponding authentication authority.

* * * * *